United States Patent [19]

Mukai et al.

[11] Patent Number: 5,255,030
[45] Date of Patent: Oct. 19, 1993

[54] CAMERA

[75] Inventors: Hiromu Mukai, Kawachinagano; Kohtaro Hayashi, Hirakata; Jun Ishihara, Sakai, all of Japan

[73] Assignee: Minolta Camera Kabushiki Kaisha, Osaka, Japan

[21] Appl. No.: 751,321

[22] Filed: Aug. 28, 1991

[30] Foreign Application Priority Data

Aug. 31, 1990 [JP] Japan .................................. 2-232205
Feb. 6, 1991 [JP] Japan .................................. 3-15369

[51] Int. Cl.⁵ ............................................ G03B 37/00
[52] U.S. Cl. .................................... 354/94; 354/106; 354/159; 354/222
[58] Field of Search ............... 354/105, 109, 106, 222, 354/159, 94, 195.12

[56] References Cited

U.S. PATENT DOCUMENTS

Re. 32,797 12/1988 Harvey .................. 354/222
4,583,831 4/1986 Harvey .................. 354/106

FOREIGN PATENT DOCUMENTS 57-74719 5/1982 Japan .
62-136631 6/1987 Japan .
1-107240 4/1989 Japan .
1-319723 12/1989 Japan .
1-319724 12/1989 Japan .
1-319725 12/1989 Japan .

Primary Examiner—David M. Gray
Attorney, Agent, or Firm—Willian Brinks Olds Hofer Gilson & Lione

[57] ABSTRACT

A camera is capable of switching normal photographing mode and panoramic photographing mode to each other and has a view finder for checking a photographing range. The view finder includes a visual frame display device, a device for varying magnification of the view finder, a control device. The visual frame display device switches a visual frame for displaying the normal photographing mode and a visual frame for displaying the panoramic photographing mode. The control device switches the visual frame display device from the visual frame for displaying the normal photographing mode to the visual frame for displaying the panoramic photographing mode and allows the magnification varying device to increase the magnification of the view finder. Instead of the control device, in switching the normal photographing mode to the panoramic photographing mode, the control device also instructs the magnification varying device to vary the magnification of the view finder so that either an angle of view corresponding to a horizontal direction or in a vertical direction in the panoramic photographing mode is displayed in the visual frame for displaying the normal photographing mode and then, instructs the visual frame display device to switch the visual frame for displaying the normal photographing mode to the visual frame for displaying the panoramic photographing mode, and the view finder magnification varying device to vary the magnification of the view finder.

27 Claims, 15 Drawing Sheets

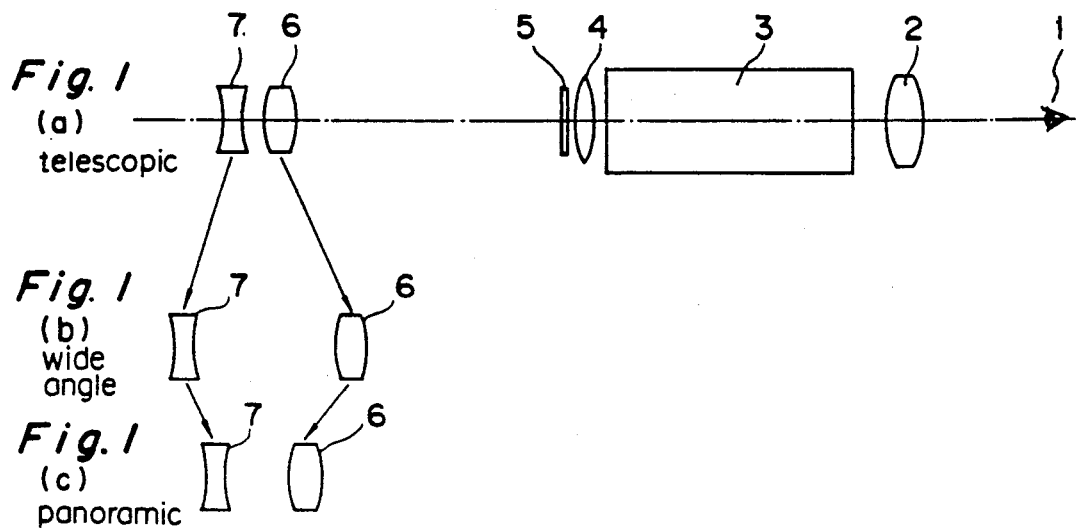
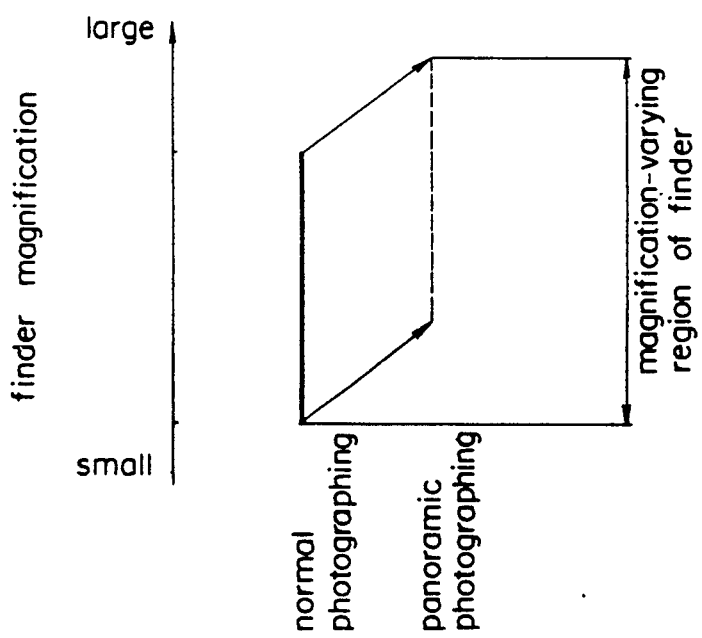

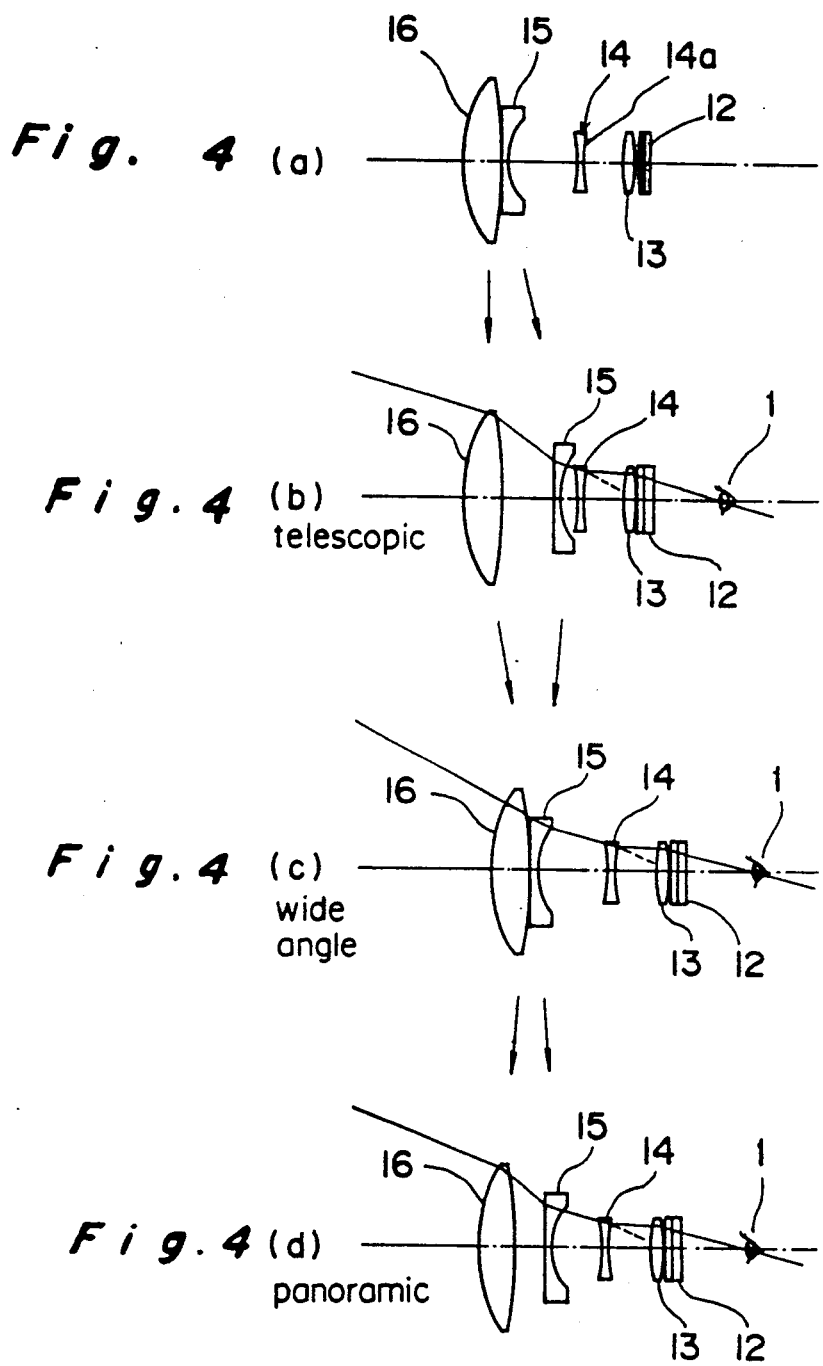

CAMERA

BACKGROUND OF THE INVENTION

The present invention relates to a camera in which the magnification of the view finder optical system is increased to extend the visual field of the view finder horizontally so that a photographer emphatically knows that photographing is to be carried out in the panoramic photographing mode.

FIG. 10 shows a normal size exposure region (A) in normal photographing mode enclosed by the solid line and a panoramic size exposure region (B) in panoramic photographing mode enclosed by the horizontal dotted lines and the vertical solid lines. In the panoramic size exposure region (B) of the conventional panoramic photographing mode, a film is restrictedly exposed in the vertical direction thereof while the film is exposed in the same area in the horizontal direction thereof, as compared with the normal size exposure region (A). The film is printed at an enlargement ratio of approximately two times so as to obtain panoramic photographing effect. In terms of the photographing range (angle of view), the exposure region (B) in the panoramic photographing mode is narrower than the exposure region (A) in the normal photographing mode. When the panoramic photographing is carried out in such an exposure region (B), the panoramic photographing range can be accurately indicated in the view finder by restricting the vertical direction.

The film having an image exposed thereon in the panoramic photographing mode is printed at an enlarged size, and then an enlarged view finder magnification allows the assumption of a printed condition. That is, in FIG. 11, the view finder visual region of the panoramic size in the panoramic photographing mode is shown by (D) surrounded with the dotted line and that of the normal size in the normal photographing mode is shown by (C) surrounded with the solid line. As shown in FIG. 11, in the panoramic photographing mode, an image to be printed can be accurately indicated by enlarging the visual field region. Therefore, there is a demand for emphatically indicating the panoramic photographing mode to a photographer by providing a horizontally extended visual field region by setting the magnification of the view finder optical system to a large one.

SUMMARY OF THE INVENTION

Accordingly, an object of the present invention is to provide a camera in which the visual field region is horizontally extended by setting the magnification of the view finder optical system to a large one so as to emphatically let a photographer know that the photographing mode is the panoramic photographing mode.

Another object of the present invention is to provide a camera in which the visual field region is horizontally extended by setting the magnification of the view finder optical system to a large one without providing an extra optical system or an eyepiece barrel so as to emphatically let a photographer know that the photographing mode is the panoramic photographing mode.

Further object of the present invention is to provide a camera in switching the normal photographing mode to the panoramic photographing mode, the photographing area can be accurately indicated in the horizontal and vertical directions so as to clearly let a photographer distinguish the panoramic photographing mode and the normal photographing mode from each other so that the photographer can effectively switch the normal photographing mode to the panoramic photographing mode.

In accomplishing these and other objects, there is provided a camera capable of switching normal photographing mode and panoramic photographing mode to each other and having a view finder for checking a photographing range, the view finder comprising:

visual frame display means for switching a visual frame for displaying the normal photographing mode and a visual frame for displaying the panoramic photographing mode;

means for varying magnification of the view finder; and control means for switching the visual frame display means from the visual frame for displaying the normal photographing mode to the visual frame for displaying the panoramic photographing mode and allowing the magnification varying means to increase the magnification of the view finder.

According to another aspect of the present invention, there is provided a camera capable of switching normal photographing mode and panoramic photographing mode to each other and having a view finder for checking a photographing range, the view finder comprising:

visual frame display means for switching a visual frame for displaying the normal photographing mode and a visual frame for displaying the panoramic photographing mode;

view finder magnification varying means for varying magnification of the view finder; and control means for, in switching the normal photographing mode to the panoramic photographing mode, instructing the magnification varying means to vary the magnification of the view finder so that either an angle of view corresponding to a horizontal direction or in a vertical direction in the panoramic photographing mode is displayed in the visual frame for displaying the normal photographing mode and then, instructing the visual frame display means to switch the visual frame for displaying the normal photographing mode to the visual frame for displaying the panoramic photographing mode, and the view finder magnification varying means to vary the magnification of the view finder.

By the above constructions of the present invention, a part of the mechanism for varying the magnification of the view finder to be used in the normal photographing mode is utilized in the panoramic photographing mode. That is, in the panoramic photographing mode, the objective lenses of the view finder optical system are moved to the telescopic side by the driving mechanism so as to obtain a large view finder magnification. Therefore, a compact camera can be manufactured at a low cost because it is unnecessary to provide the camera with an extra optical system or an eyepiece barrel. Further, the visual region of the visual frame is widened horizontally with the magnification of the view finder optical system increased so as to emphatically let a photographer know that the photographing mode is in the panoramic photographing mode.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1 is a schematic descriptive view of a camera according to an embodiment of the present invention;

FIG. 3 is a descriptive view for describing the relationship between a view finder magnification and the varying region of the view finder;

FIG. 4 is a schematic descriptive view of a camera according to another embodiment;

DETAILED DESCRIPTION OF THE INVENTION

Figure 2:
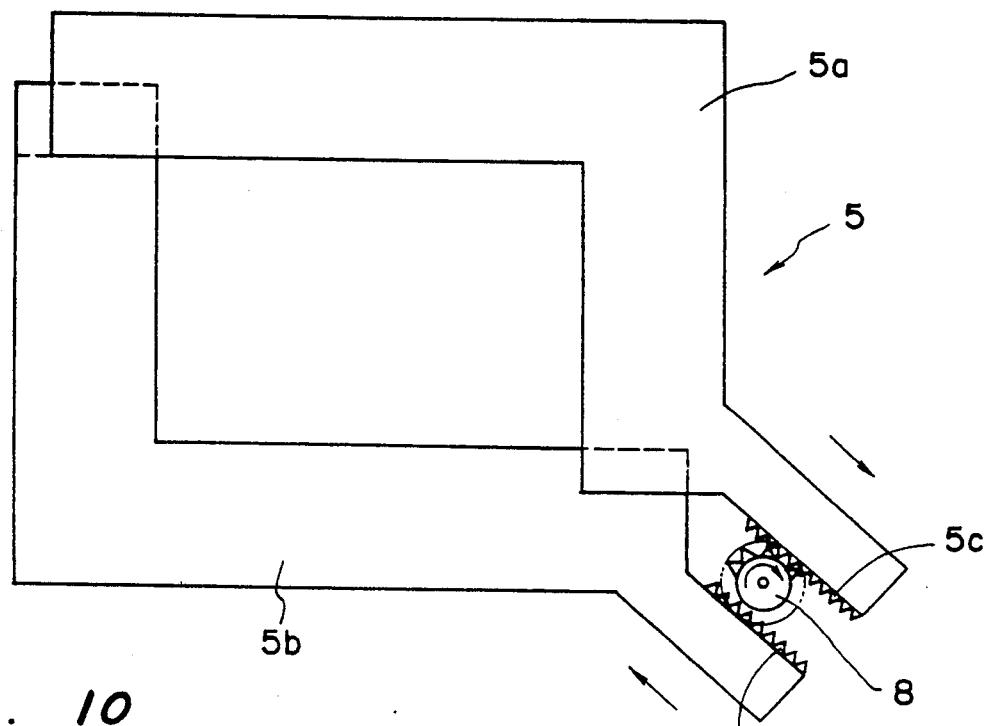
FIG. 2 is a descriptive view showing a mechanism for switching the visual frame of the camera according to the embodiment of the present invention.
Figure 10:
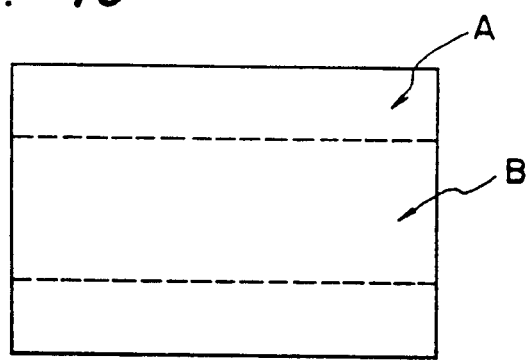
FIG. 10 is a descriptive view showing the relationship between the exposure region in the normal photographing mode and the exposure region in the panoramic photographing mode.

Before the description of the present invention proceeds, it is to be noted that like parts are designated by like reference numerals throughout the accompanying drawings.

Referring to FIGS. 1 through 9 and FIGS. 11 through 14, a camera according to an embodiment of the present invention is described below.

The camera view finder according to the embodiment of the present invention comprises a Keplerian view finder as shown in FIG. 1.

The view finder comprises objective lenses 6 and 7, a visual frame 5 provided at the position at which an image is formed by the objective lenses 6 and 7, a condenser lens 4 positioned in the vicinity of the visual frame 5, an eyepiece 2, and a reversal prism 3 positioned between the condenser lens 4 and the eyepiece 2 to horizontally and vertically reverse an image.

The condenser lens 4 has a function of projecting the image of a pupil 1 of a photographer on the objective lenses 6 and 7, reducing the region of luminous fluxes which pass through the objective lenses 6 and 7, thus reducing the effective apertures of the objective lenses 6 and 7. A Porro prism or a relay lens (lens for re-forming image formed by objective lens) is used as the reversal prism 3. The eyepiece 2 is used to observe an image by enlarging an image formed on the visual frame 5.

FIG. 1 shows an embodiment in which the photographing lens is a zoom lens and panoramic photographing is carried out not at all focal lengths thereof, but on the wide angle side.

Figure 12:
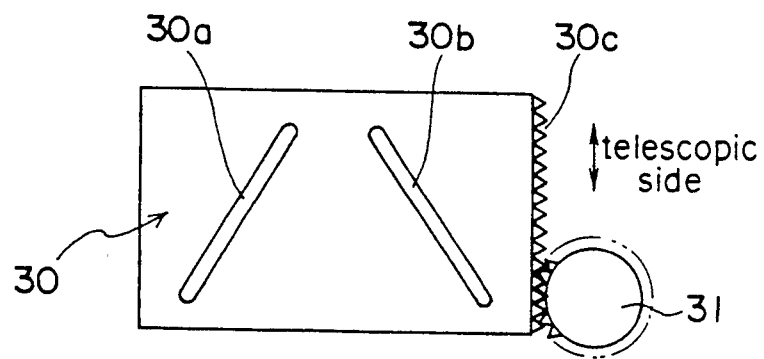
FIG. 12 is a plan view showing a mechanism for driving an objective lens according to the first embodiment of the present invention.
Figure 13:
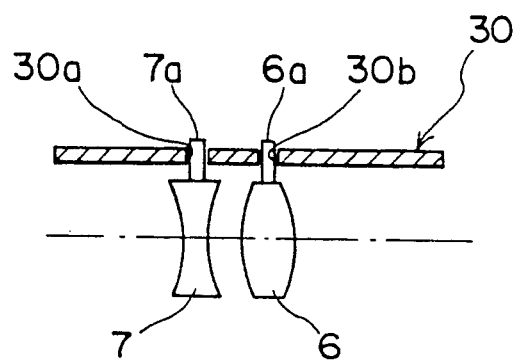
FIG. 13 is a longitudinal sectional view showing the mechanism for driving the objective lens according to the first embodiment of the present invention.

The objective lens 6 of the view finder is a positive lens and the objective lens 7 thereof is a negative lens. An objective lens driving mechanism as shown in FIGS. 12 and 13 varies the magnification of the view finder by changing the interval between the objective lenses 6 and 7. That is, referring to FIGS. 12 and 13, according to the objective lens driving mechanism, the upper ends 7a and 6a of the negative lens 7 and the positive lens 6 movably engage cam grooves 30a and 30b of a cam plate 30, respectively, and a pinion 31 connected with a stepping motor not shown engages a rack 30c provided at an end of the cam plate 30. The pinion 31 rotates in both ways by the both-way drive of the stepping motor. As a result, the cam plate 30 moves vertically as shown by the arrow of FIG. 12 and consequently, both lenses 6 and 7 approach to each other or moves away from each other. The lenses 6 and 7 are positioned on the telescopic side with the upward movement of the cam plate 30 in FIG. 12. Therefore, in the panoramic photographing, the control circuit outputs an arbitrary number of pulses to the stepping motor. As a result, the stepping motor rotates according to the arbitrary number of pulses, thus moving the lenses 6 and 7. The objective lenses 6 and 7 are moved to the telescopic side while the angle of view of the view finder is on the wide angle side. Thus, the magnification of the view finder is increased.

A mechanism as shown in FIG. 2 changes the region of the visual frame 5 to correspond to the change in the angle of view between the normal photographing mode and the panoramic photographing mode. That is, the mask of the visual frame 5 is composed of masks 5a and 5b. Racks 5c and 5d are formed on one ends of the masks 5a and 5b which are opposed to each other, thus engaging the racks 5c and 5d with a pinion 8. The upper mask 5a moves downward and the lower mask 5b moves upward with the clockwise rotation of the pinion 8 in FIG. 2. As a result, the visual region of the visual frame 5 is narrowed vertically and widened horizontally. Refer to panoramic photographing mode shown by the dotted line of FIG. 11A. The upper mask 5a moves upward and the lower mask 5b moves downward with the counterclockwise rotation of the pinion 8. As a result, the visual region of the visual frame 5 is widened vertically and narrowed horizontally. Refer to the normal photographing mode shown by the solid line of FIG. 11A.

Figure 11A:
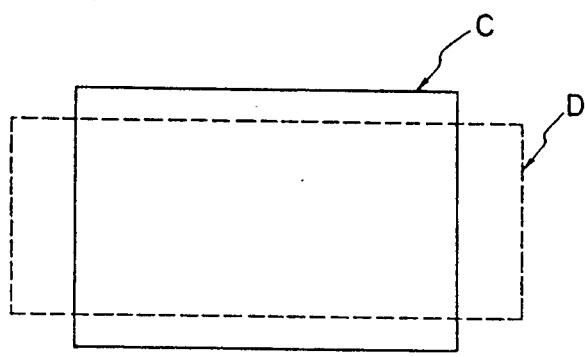
FIG. 11A is a descriptive view showing the visual field region of a view finder in the normal photographing mode and the visual field region of a view finder in the panoramic photographing mode.

Referring to FIG. 11A, the visual region of the view finder of the panoramic size in the panoramic photographing mode is shown by the region surrounded with the dotted line (D) and the visual region of the view finder of the normal size in the normal photographing mode is shown by the region surrounded with the solid line (C).

Figure 11B:
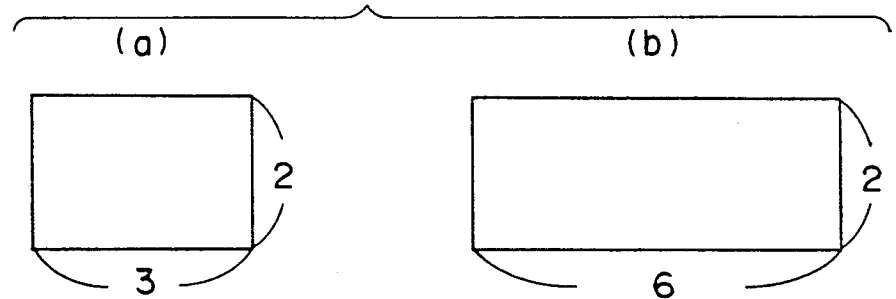
FIG. 11B is a view showing the print size in normal photographing mode and that in panoramic photographing mode.

Referring to FIG. 11B, (a) shows a normal print size and (b) indicates the panoramic size. The image of the film is printed by enlarging the panoramic size (b) approximately twice as large as that.

Figure 14:
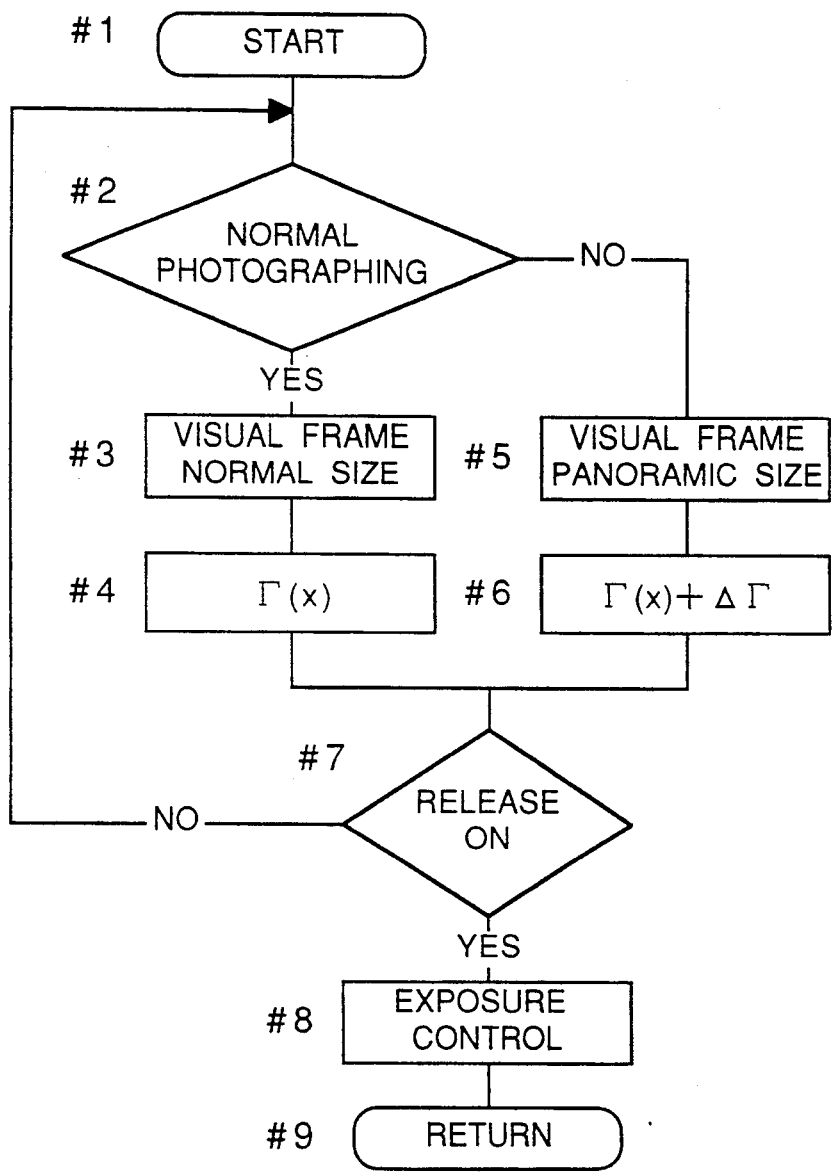
FIG. 14 is a flowchart showing the relationship between the movement of the objective lens and visual frame display member according to the first embodiment of the present invention.

FIG. 14 shows the relationship between the mechanism for changing the visual frame 5 and the objective lens driving mechanism. When a photographing operation starts in the camera having the mechanisms at step #1, it is decided at step #2 whether or not the photographing mode is in the normal photographing mode. More specifically, it is decided whether the switch of the photographing mode is at the position corresponding to the normal photographing mode or the panoramic photographing mode. If the switch is at the position corresponding to the normal photographing mode, the masks 5a and 5b are moved at step #3 so that the visual region of the visual frame 5 is set to the normal size in the normal photographing mode as shown by the solid line in FIG. 11A, i.e., the visual region thereof is widened vertically and narrowed horizontally. At step #4, the stepping motor of the objective lens driving mechanism is rotated to move the objective lenses 6 and 7 of the view finder to the predetermined positions so as to obtain a view finder magnification Γ(x) corresponding to the angle of view of the photographing lens. Then, it is decided at step #7 whether or not the release button is pressed. If yes, the normal photographing operation is carried out by controlling the exposure at step #8. Then, the program returns at step #9. If it is decided at step #7 that the release button is not pressed, the program returns to step #2 at which it is decided whether or not the photographing mode is in the normal photographing mode. If no, at step #2, i.e., if the photographing mode is in the panoramic photographing mode, the masks 5a and 5b are moved at step #5 so that the visual region of the visual frame 5 is set to the panoramic size in the panoramic photographing mode as shown by the dotted line in FIG. 11A, i.e., the visual region thereof is narrowed vertically and widened horizontally. Then, at step #6, the stepping motor is rotated further to move the objective lenses 6 and 7 each to the predetermined position of the telescopic side as compared with that at step #4 so as to obtain a view finder magnification larger than the magnification Γ(x) in the normal photographing mode by ΔΓ, namely, Γ(x) + ΔΓ. Then, it is decided at step #7 whether or not the release button is pressed. If yes, the panoramic photographing is carried out at step #8. In the flowchart of FIG. 14, the visual frame 5 is driven at steps #3 and #5 and then, the objective lenses 6 and 7 are driven at steps #4 and #6. But instead of it the objective lenses 6 and 7 may be driven and then, the visual frame 5 may be driven.

In the above embodiment, a part of the mechanism for varying the magnification of the view finder to be used in the normal photographing mode is utilized in the panoramic photographing mode. That is, in the panoramic photographing mode, the objective lenses 6 and 7 of the view finder optical system are moved to the telescopic side by the driving mechanism so as to obtain a large view finder magnification. Therefore, a compact camera can be manufactured at a low cost because it is unnecessary to provide the camera with an extra optical system or an eyepiece barrel. Further, the visual region of the visual frame 5 is widened horizontally with the magnification of the view finder optical system increased so as to emphatically let a photographer know that the photographing mode is in the panoramic photographing mode.

Another embodiment of the present invention is described below. In the above embodiment, the photographing lens is a zoom lens and panoramic photographing is carried out at all focal lengths of the photographing lens as shown in FIG. 3. The magnification varying range of the view finder may be widened in the telescopic side so that the visual region is widened in the panoramic photographing mode.

A further embodiment of the present invention is described below. A virtual image type panoramic view finder is used as the view finder optical system of the embodiment of the present invention.

Figure 5:
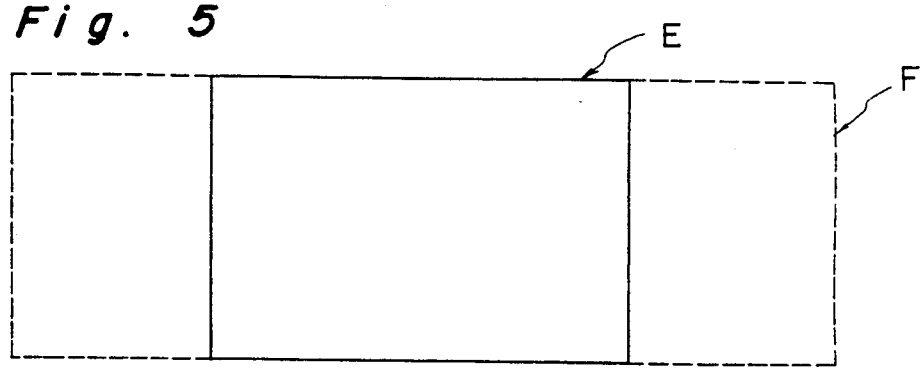
FIG. 5 is a descriptive view for showing the visual region of a view finder according to the above embodiment.

In this embodiment, as the visual region of the view finder is shown in FIG. 5, in correspondence with the magnification of the view finder in the panoramic photographing mode, the vertical size of the visual region (E) of the view finder in the normal photographing mode is the same as the vertical size of the visual region (F) of the view finder in the panoramic photographing mode. That is, the view finder of this embodiment has a view finder magnification as approximately twice as large as that in the normal photographing mode.

The view finder optical system of this embodiment comprises a positive lens 16, a negative lens 15, a negative lens 14, and a positive lens 13 as shown in FIG. 4. The magnification of the view finder is varied by the movement of the lenses 16 and 15 positioned on the object side. The surface of the lens 14 on the pupil side is a half mirror surface 14a. The lens 14 and a member 12 for displaying the visual frame compose an Albada view finder system. The member 12 is arranged on the pupil side of the positive lens 13.

Figure 6:
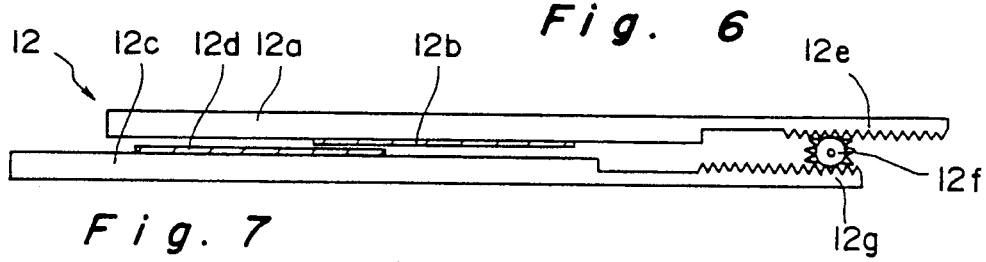
FIG. 6 is a plan view showing a visual frame display member in panoramic photographing mode according to the embodiment.
Figure 7:
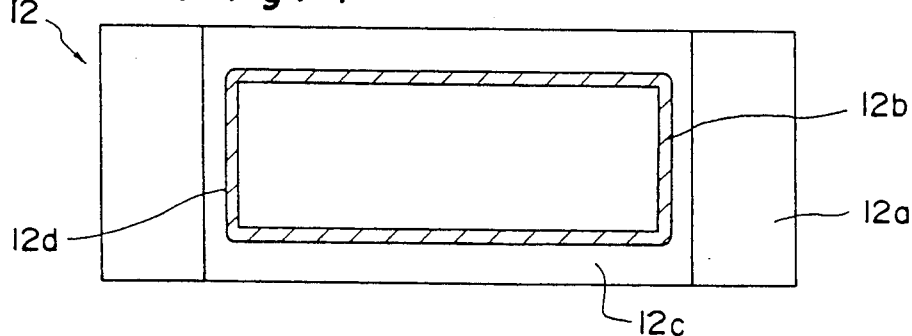
FIG. 7 is a front view showing the visual frame display member in panoramic photographing mode according to the embodiment.
Figure 8:
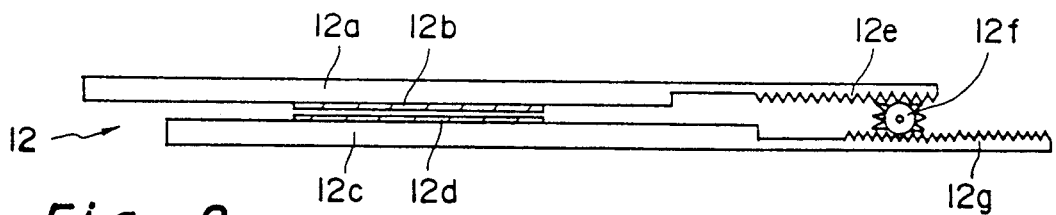
FIG. 8 is a plan view showing the visual frame display member in normal photographing mode according to the embodiment.
Figure 9:
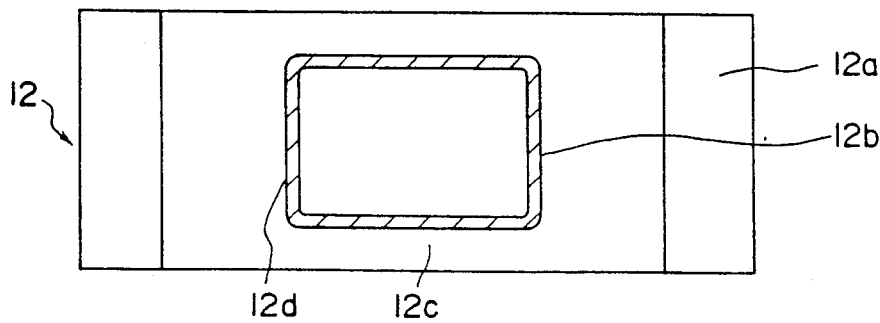
FIG. 9 is a front view showing the visual frame display member in normal photographing mode according to the embodiment.

As shown in FIGS. 6 through 9, the member 12 comprises glass plates 12a and 12c opposed to each other and visual frames 12b and 12d, consisting of an aluminum-evaporated film, displayed on the glass plates 12a and 12c, respectively. More specifically, a U-shaped visual frame 12b is formed on the glass plate 12a and an inverted U-shaped visual frame 12d is formed on the glass plate 12c to oppose the frame 12b. Thus, the inside of a rectangular frame formed with the visual frames 12b and 12d is the visual region. Racks 12e and 12g are formed on one ends of the glass plates 12a and 12c opposed to each other, respectively. A pinion 12f is arranged between the racks 12e and 12g to engage the racks 12e and 12g. According to the rotation of the pinion 12f, the glass plates 12a and 12c move in the directions opposite to each other. A horizontally wide visual region of the panoramic size in the panoramic photographing mode as shown in FIGS. 6 and 7 is switched to a vertically narrow visual region of the normal size in the normal photographing mode as shown in FIGS. 8 and 9 or vice versa.

Each of the visual frames is made of an aluminum-evaporated film in the above-described embodiment, but each of them may be made of an electro-optic element such as a liquid crystal display or electrochromic display (ECD) so as to switch the configuration of the visual frame, namely, the visual region electrically.

Figure 15:
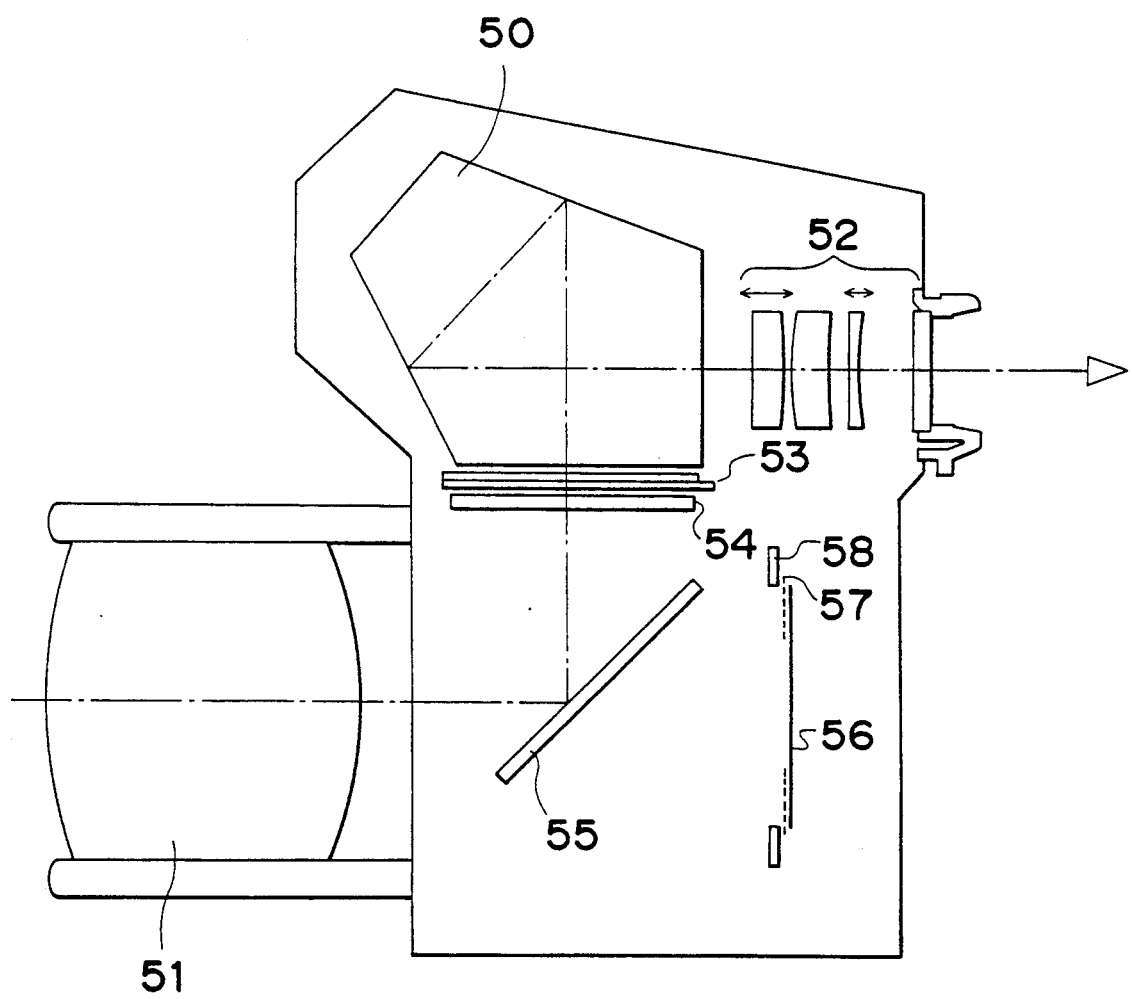
FIG. 15 is a schematic construction view of a single-lens reflex camera according to still another embodiment of the present invention.
Figure 16:
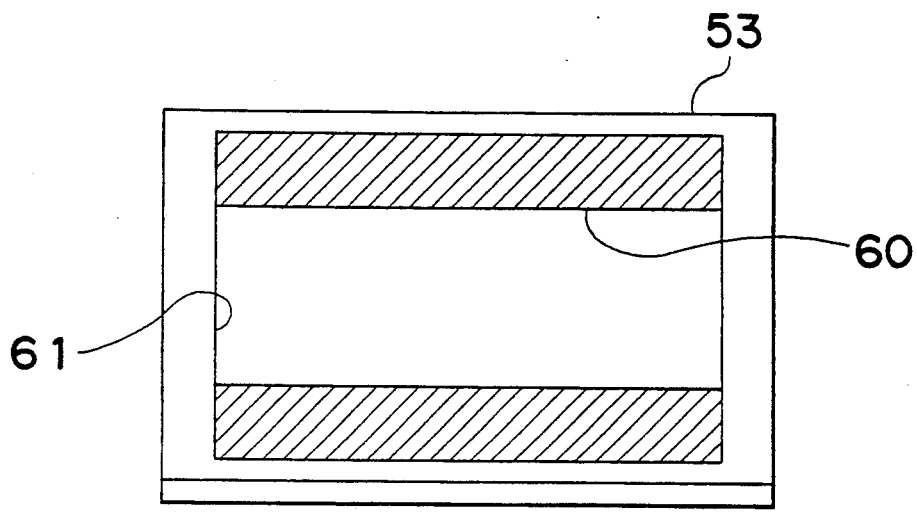
FIG. 16 is a view showing the visual range of a camera in panoramic photographing mode according to the embodiment shown in FIG. 15.

A still another embodiment is described with reference to FIG. 15 showing a single-lens reflex camera in which an eyepiece is provided with a magnification varying mechanism so as to increase the view finder magnification. An LCD 53 can switch between the visual frame in the normal photographing mode and the visual frame in the panoramic photographing mode or vice versa and set the normal photographing frame. The view finder comprises a penta prism 50, a photographing lens 51, an eyepiece 52 provided with a magnification varying mechanism, a focusing plate 54, a main mirror 55, a film 56, a panoramic photographing frame 57, and a normal photographing frame 58. In this embodiment, when the view finder magnification is increased in the panoramic photographing mode of a single-lens reflex camera, a lens or lenses in the magnification varying mechanism are moved in the eyepiece. FIG. 15 shows a construction view showing in the condition where the lens or lenses in the magnification varying mechanism are moved in the eyepiece in order to increase the magnification in the panoramic photographing mode. As shown in FIG. 16, the LCD 53 displays the visual range in the panoramic photographing mode. In the normal photographing mode, the LCD 53 spreads to a normal photographing visual frame 61, so that the LCD 53 is entirely transparent and an image on the focusing plate 54 can be entirely viewed in the view finder. In the panoramic photographing mode, the area covered with the diagonal lines of the LCD 53 in FIG. 16 is untransparent so that only the panoramic photographing range is transparent.

When the magnification varying mechanism is not operated, upper and lower portions of the visual frame of the view finder are transparent. In the panoramic photographing mode, the upper and lower portions of the visual frame are untransparent and the magnification varying mechanism of the eyepiece is operated to increase the magnification of the view finder. Thus, as shown in FIG. 11A, the visual region is horizontally widened. According to the magnification varying mechanism of the eyepiece of the single-lens reflex camera, the eyepiece 52 may be moved along the optical axis as shown by the arrows in FIG. 15 or a magnification varying lens may be moved in the eyepiece 52 or a lens as a part of the eyepiece 52 may be exchanged with another magnification varying lens. In the panoramic photographing mode, the upper and lower areas of the LCD 53 are untransparent as described previously, but instead, untransparent lines may be displayed to show the visual region in the panoramic photographing mode.

Figure 17:
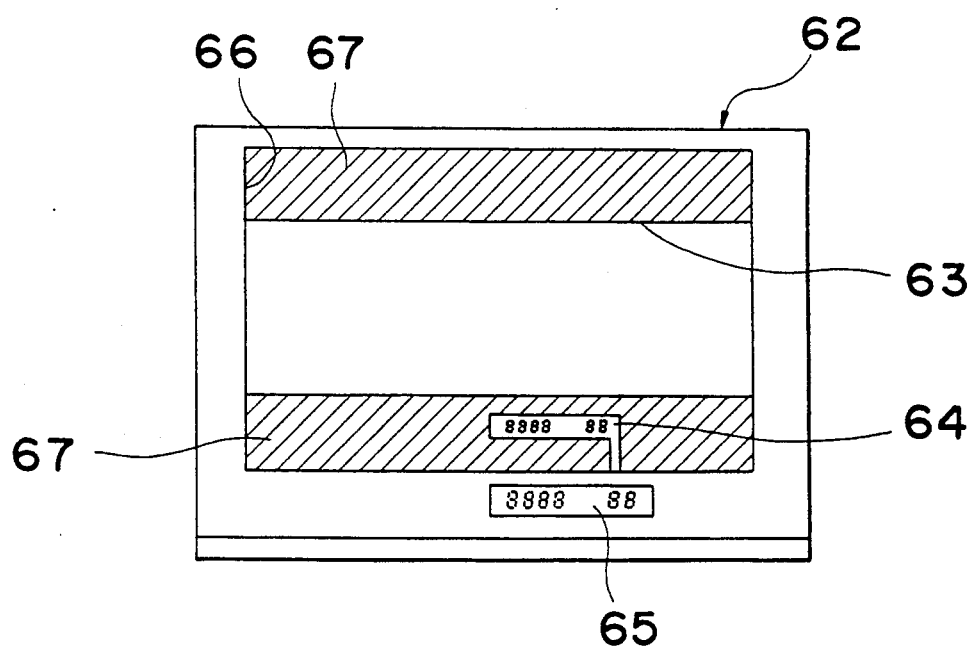
FIG. 17 is a view showing the visual range of a camera according to a further embodiment of the present invention.

Modifications of the embodiments described with reference to FIGS. 15 and 16 are described with reference to FIGS. 17 through 21. According to a single-lens reflex camera of this modification, an indication within finder is provided and the size of the indication in the normal photographing mode is the same as that in the panoramic photographing mode. Referring to FIG. 17, an area 67 shown with the diagonal lines is untransparent in a visual frame 66 for the normal photographing mode so as to display the a visual frame 63 for the panoramic photographing mode. The LCD 62 has an indicating member 64 for the panoramic photographing mode and an indicating member 65 for the normal photographing mode. The reason the indicating member 64 is smaller than the indicating member 65 is because the visual region in the panoramic photographing mode becomes approximately the same size as that in normal photographing mode in increasing the magnification of the view finder in the panoramic photographing mode.

Figure 18:
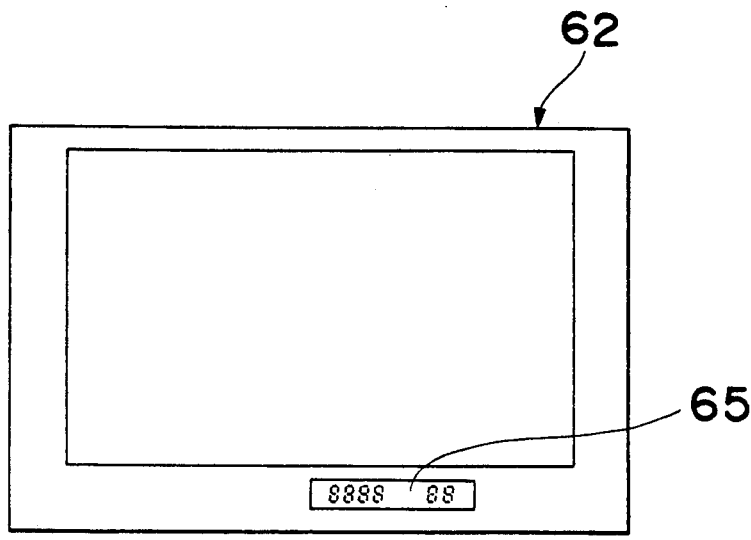
FIG. 18 is a view showing the visual field region of a view finder of the camera in normal photographing mode according to the embodiment shown in FIG. 17.
Figure 19:
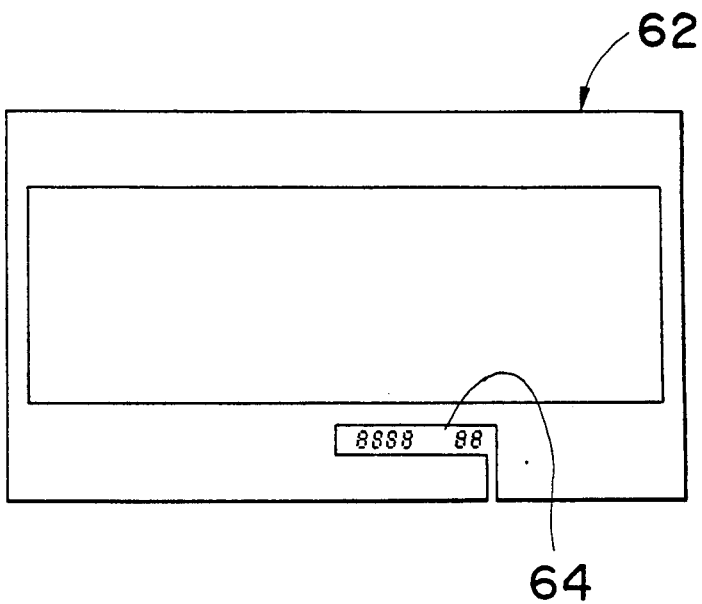
FIG. 19 is a view showing the visual field region of the view finder of the camera in panoramic photographing mode according to the embodiment shown in FIG. 17.

FIG. 18 shows the visual region of the view finder in the normal photographing mode. In the normal photographing mode, the panoramic photographing visual frame and the panoramic photographing indicating member are turned off so that the interior of the visual frame for the panoramic photographing mode is transparent and the normal photographing indicating member indicates a shutter speed and an aperture value. FIG. 19 shows the visual region of the view finder in the panoramic photographing mode. In the panoramic photographing mode, the magnification of the magnification varying mechanism is increased and the panoramic photographing visual frame is turned on so that the interior of the visual frame for the panoramic photographing mode is untransparent and the normal photographing indicating member indicates a shutter speed and an aperture value. At this time, since the normal photographing indicating member is at a position away from the visual frame so as to increase the magnification of the view finder, the normal photographing indicating member can be hardly seen or cannot be seen. Therefore, the normal photographing indicating member may be turned on or off.

Figure 20:
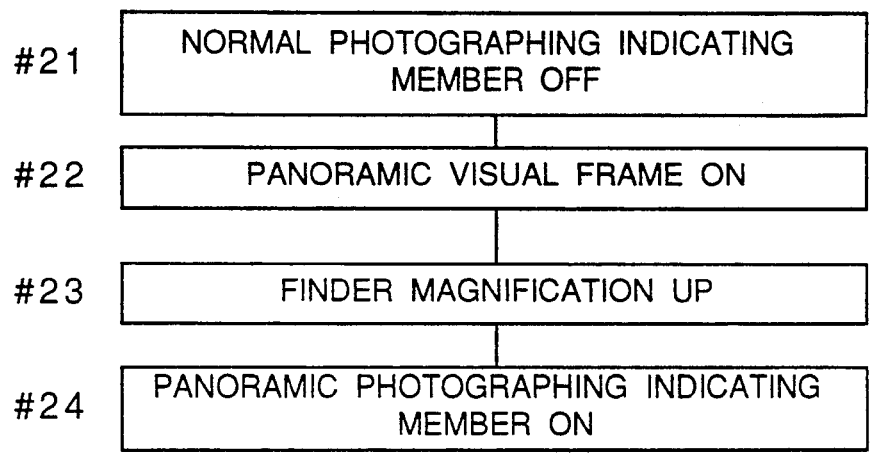
FIGS. 20 and 21 are flowcharts indicating the photographing mode switching operation of the camera according to the embodiment shown in FIG. 7.
Figure 21:
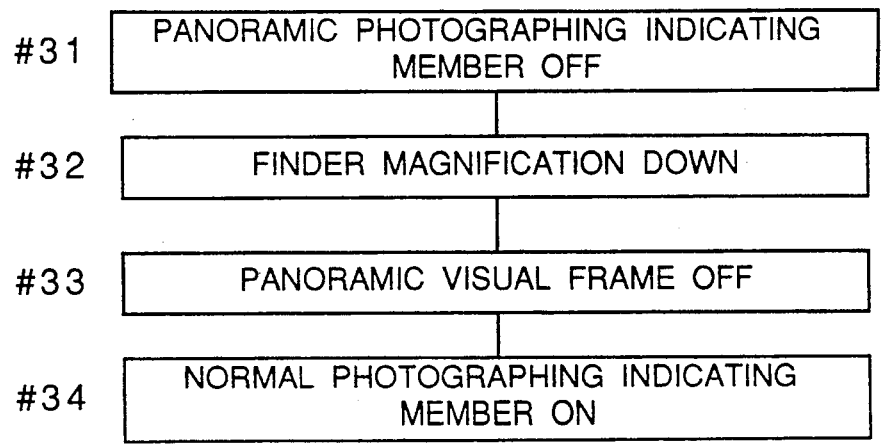

The operation of this modification is described with reference to the flowchart shown in FIGS. 20 and 21. When the normal photographing mode is switched to the panoramic photographing mode, the normal photographing indicating member 65 is turned off at step #21, the panoramic visual frame is turned on at step #22, the view finder magnification is increased at step #23, and the panoramic photographing indicating member 64 is turned on at step #24. When the panoramic photographing mode is switched to the normal photographing mode, as shown in FIG. 21, the panoramic photographing indicating member 64 is turned off at step #31, the magnification of the view finder is reduced at step #32, the panoramic visual frame is turned off at step #33, and the normal photographing indicating member 65 is turned on at step #34.

In this modification, the normal photographing indicating member 65 is integrally incorporated in an LCD of the panoramic visual frame and the panoramic photographing indicating member 64, but may be mounted in a separate LCD.

A still another embodiment of the present invention is described below with reference to FIGS. 22 through 25.

Figure 22:
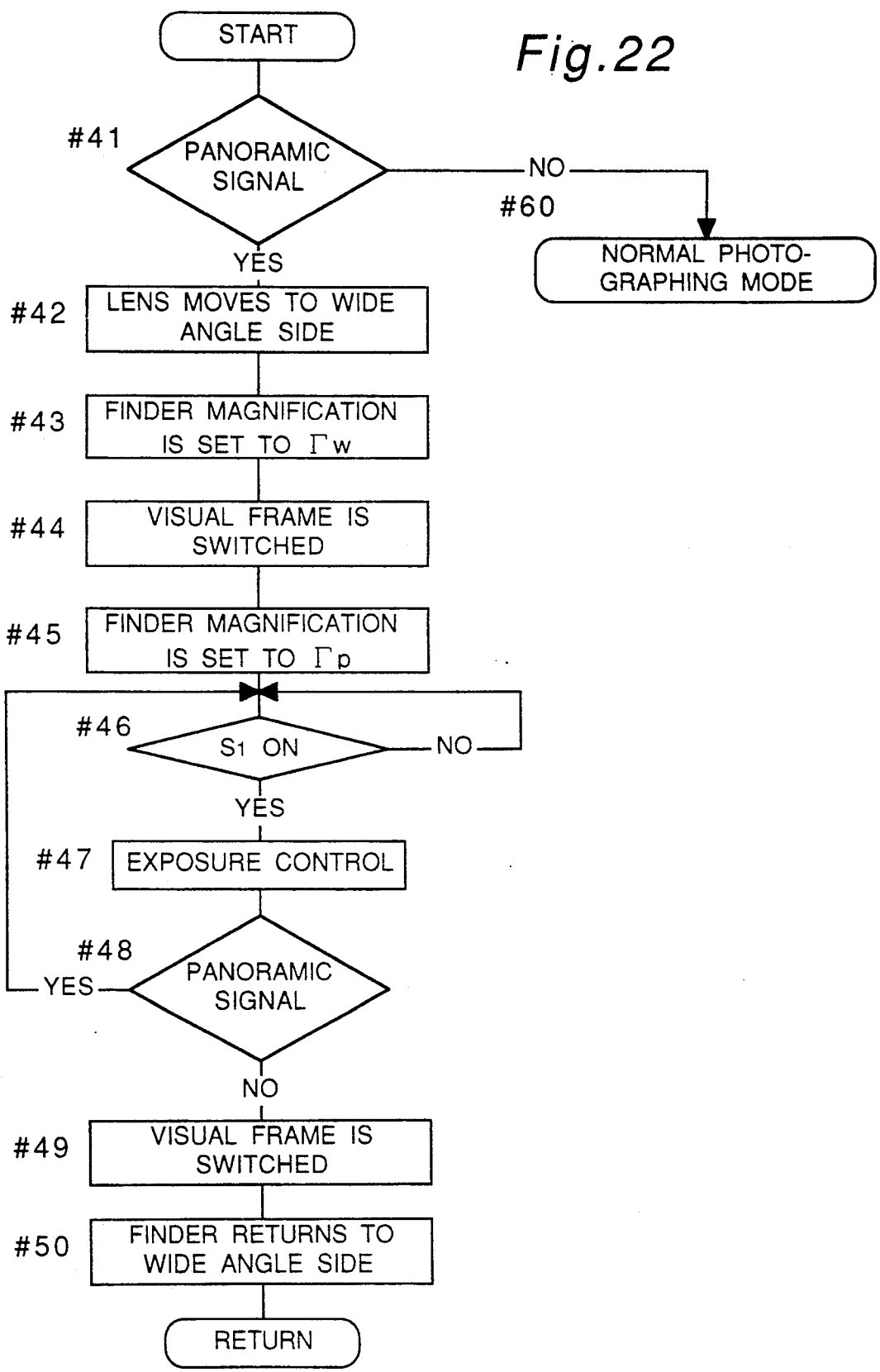
FIG. 22 is a flowchart showing a routine for switching normal photographing mode to panoramic photographing mode.

The operation of this embodiment is described with reference to the flowchart shown in FIG. 22.

In this embodiment, the panoramic photographing can be carried out only when the photographing lens is on the wide angle side. It is decided at step #41 whether or not the change-over switch, arranged on the camera body, for carrying out the panoramic photographing is pressed, i.e., whether or not the panoramic signal is turned on. If the panoramic signal is ON, the program goes to step #42. If the panoramic signal is not ON, the program goes to step #60 at which photographing can be carried out in the normal photographing mode. At step #42, the photographing lens moves to the wide angle side such that the angle of view of the view finder is maximum. At step #43, Referring to FIG. 1(b), the magnification of the view finder is set to $\Gamma w$. In this condition, the photographing region in the horizontal direction in the panoramic photographing is accurately displayed. At step #44, the visual frame is switched to the panoramic photographing format. At step #45, the view finder magnification is set to a large magnification $\Gamma p$ for the panoramic photographing. In this condition, referring to FIG. 1(b), the magnification is $\alpha$ times as large as the magnification on the wide angle side. That is, the magnification of the view finder is $\Gamma p = \Gamma w \times \alpha$. Then, it is decided at step #46 whether or not the release switch $S_1$ is pressed. If no, the program waits until the switch $S_1$ is pressed. If yes, an exposure control is performed at step #47, and it is decided at step #48 whether or not the panoramic photographing mode is cancelled after the exposure control terminates. If the panoramic photographing mode is cancelled, the visual frame is returned to the position corresponding to the normal photographing mode at step #49, and the view finder magnification is returned to the magnification $\Gamma w$ of the normal photographing mode at step #50. Then, the program returns. If the panoramic signal is ON at step #48, i.e., if the panoramic mode is not cancelled, the program returns to step #46.

Figure 23:
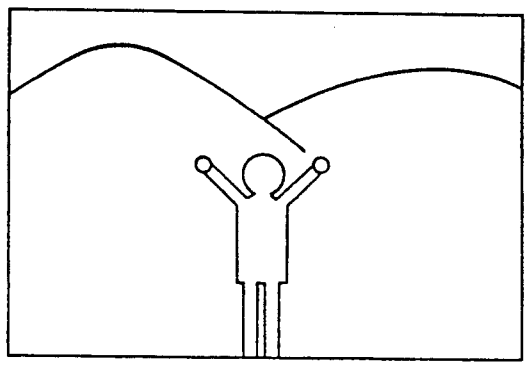
FIG. 23 is a view showing an object seen through a view finder at an arbitrary magnification.
Figure 24:
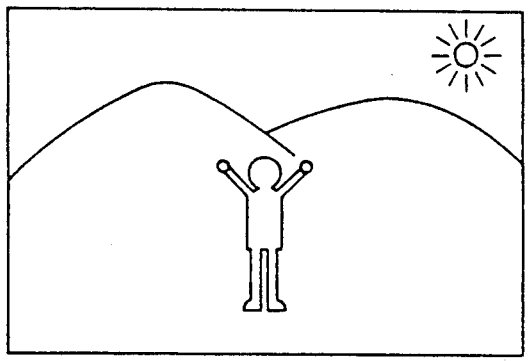
FIG. 24 is a view showing an object seen through the view finder at an angle of view on the wide angle side in panoramic photographing mode.
Figure 25:
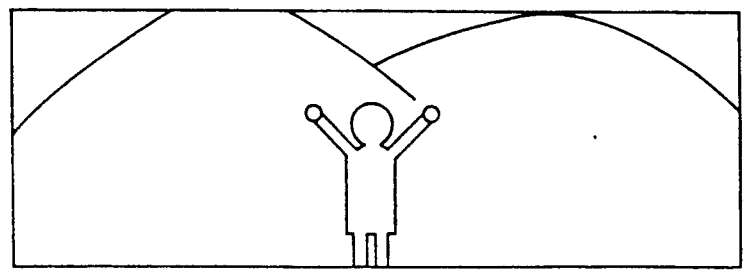
FIG. 25 is a view showing an object seen through the view finder at a magnification increased by α in panoramic photographing mode.

FIGS. 23 through 25 show an object as viewed through the view finder. FIG. 23 show an object viewed through the view finder at an arbitrary magnification. FIG. 24 show an object viewed through the view finder at a wide angle of view upon ON of the panoramic photographing mode at step #43. Only the angle of view in the horizontal direction is accurate. FIG. 25 shows an object viewed through the view finder at the panoramic magnification increased $\alpha$ times as large as the magnification on the wide angle side at step #45.

In the above-described embodiment, in the panoramic photographing mode, the view finder is moved to a first position (wide angle side) showing the angle of view in the horizontal direction in the panoramic photographing mode, then to a second position showing a magnification in the panoramic photographing mode. Accordingly, the horizontally enlarged visual region can be accurately displayed, which allows a photographer to distinguish the panoramic visual field from the visual field in the normal photographing mode.

Figure 26:
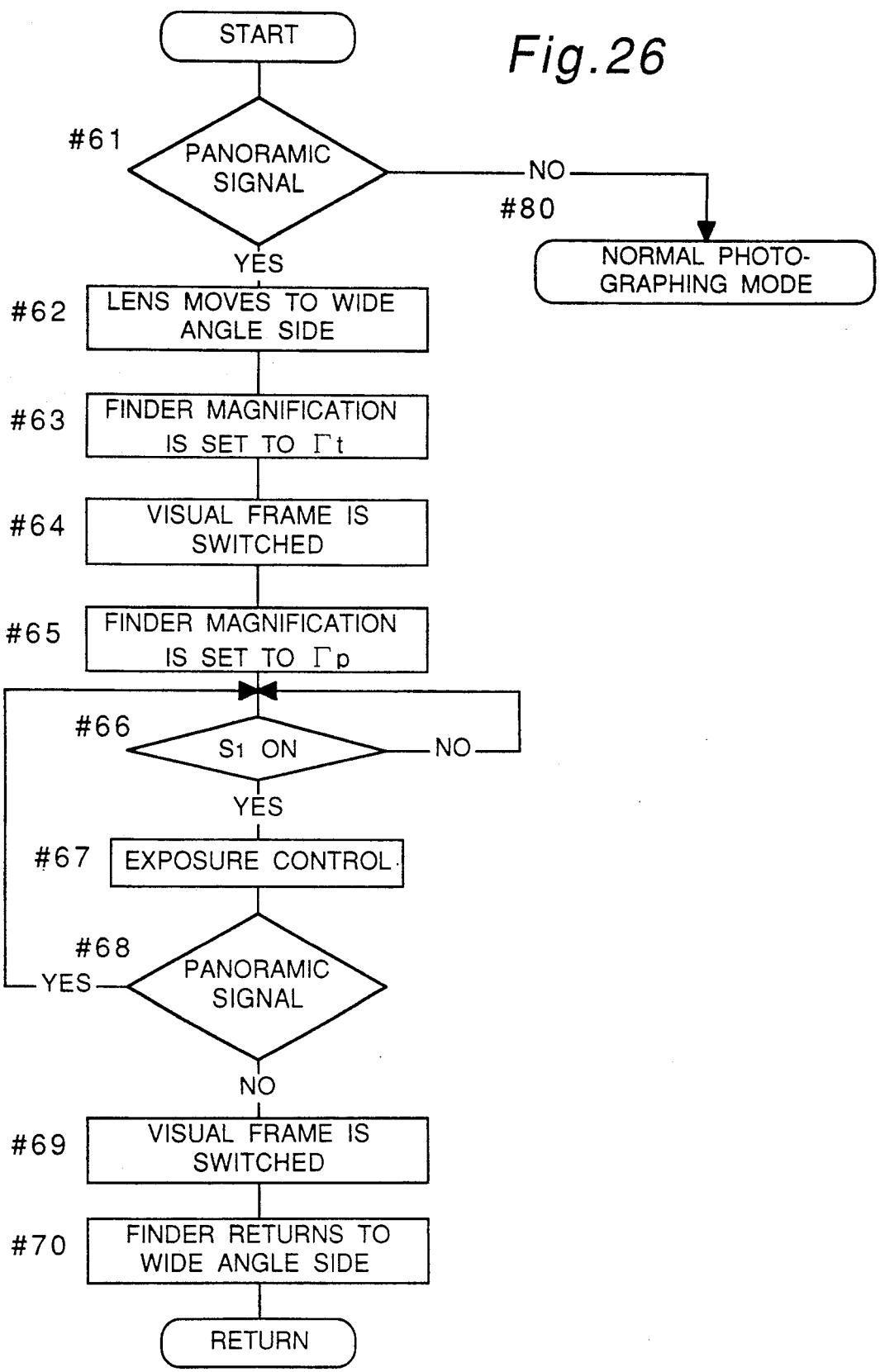
FIG. 26 is a flowchart showing a routine for switching normal photographing mode to panoramic photographing mode according to a further embodiment.

A still further embodiment of the present invention is described below with reference to another routine as shown in FIG. 26.

In this embodiment, the panoramic photographing can be carried out only when the photographing lens is on the wide angle side. It is decided at step #61 whether or not the change-over switch, arranged on the camera body, for carrying out the panoramic photographing is pressed. If yes, the panoramic signal is ON and the program goes to step #62. If no, the program goes to step #80 at which photographing can be carried out in the normal photographing mode. At step #62, the photographing lens is moved to the wide angle side such that the angle of view of the view finder is maximum. At step #63, the view finder is moved to the telescopic side. Supposing that the ratio of the size of an image on the film in the normal photographing mode and the size of the image on the film in the panoramic photographing is $\Delta\Gamma = H/H'$. The magnification of the view finder is changed to $\Gamma t (= \Gamma w * \Delta\Gamma)$. Thus, the vertical photographing region is accurately displayed. Further, the size of an image to be printed can be supposed. At step #64, the visual frame is moved to reduce the photographing region vertically and horizontally. Then, at step #65, the objective lenses of the view finder are moved to obtain the panoramic magnification $\Gamma p$ corresponding to the reduced photographing region. As a result, the panoramic magnification is $\Gamma p = \Gamma w * \alpha$ or $\Gamma p = \Gamma t * (\Delta\Gamma - \alpha)$. In the above, $\Gamma w$ is the magnification of the view finder on the wide angle side and $\alpha$ is the magnification of the view finder in the panoramic photographing mode. Then, it is decided at step #66 whether or not the release switch $S_1$ is pressed. If no, the program waits until the release switch $S_1$ is pressed. If the release switch $S_1$ is pressed at step #66, an exposure control is performed at step #68 and it is decided at step #68 whether or not the panoramic photographing mode is cancelled after the exposure control terminates. If yes, the visual frame is returned to the position corresponding to the normal photographing mode at step #69 and the view finder magnification is returned to the magnification in the normal photographing mode $\Gamma w$ at step #70. Then, the program returns. If the panoramic signal is ON at step #68, i.e., if the panoramic photographing mode is not cancelled, the program returns to step #66.

Figure 27:
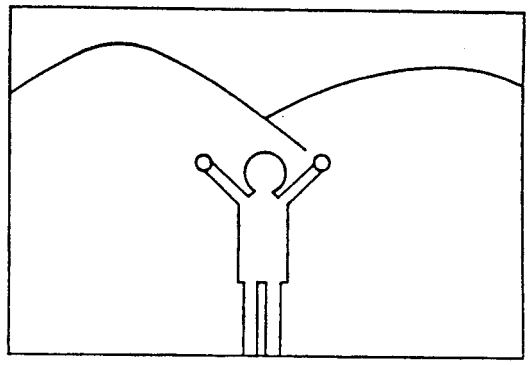
FIG. 27 is a view showing an object seen through a view finder at an arbitrary magnification.
Figure 28:
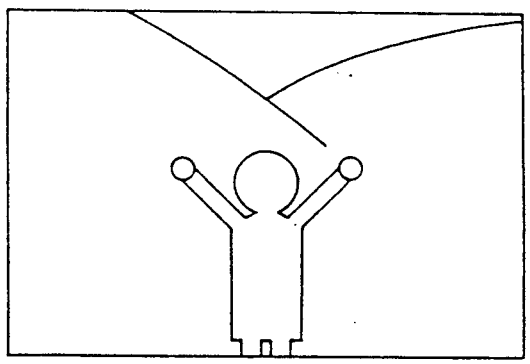
FIG. 28 is a view showing an object seen through a view finder at a large magnification upon ON of panoramic photographing mode with the visual field region enlarged vertically.
Figure 29:
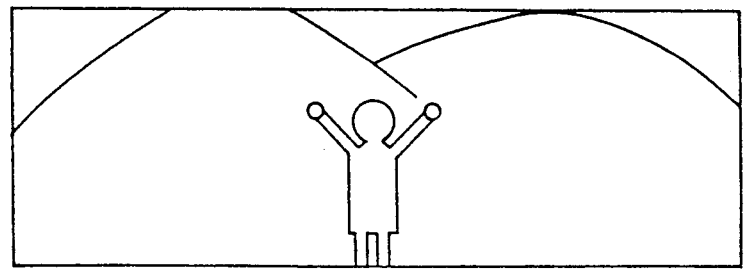
FIG. 29 is a view showing a region in panoramic photographing mode.

FIGS. 27 through 29 show an object as viewed through the view finder. More specifically, FIG. 27 shows an object viewed through the view finder at an arbitrary magnification. FIG. 28 show an object viewed through the view finder at a large magnification upon ON of the panoramic photographing mode with the visual region enlarged vertically at step #63. FIG. 29 shows a condition in which the panoramic region is accurately shown at step #65.

In the above-described embodiments, in the panoramic photographing mode, the objective lenses of the view finder are moved to a first position (wide angle side) showing the angle of view in the vertical direction in the panoramic photographing mode, then to a second position showing a magnification in the panoramic photographing mode. Accordingly, the vertically enlarged visual region can be accurately displayed, which allows a photographer to distinguish the visual field in the panoramic photographing mode from the visual field in the normal photographing mode.

According to the construction of the present invention, in the panoramic photographing mode, the objective lenses of the view finder are moved to the first position showing either the angle of view in the horizontal direction or in the vertical direction, then to a second position showing a magnification in the panoramic photographing mode. Accordingly, the vertically or horizontally enlarged visual region can be accurately displayed, which allows a photographer to distinguish the visual field in the panoramic photographing mode and the visual field in the normal photographing mode from each other.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera capable of switching between a first photographing mode and a second photographing mode in which a ratio of a horizontal direction size against a vertical direction size is greater than said ratio to each other in said first photographing mode and having a view finder for checking a photographing range, the view finder comprising:
    visual frame display means for switching a visual frame for displaying the first photographing mode and a visual frame for displaying the second photographing mode;
    view finder magnification varying means for varying magnification of the view finder; and
    control means for switching the visual frame display means between the visual frame for displaying the first photographing mode and the visual frame for displaying the second photographing mode and increasing the magnification of the view finder with the magnification varying means when the visual frame display means is switched to the visual frame for displaying the second photographing mode.

2. The camera as claimed in claim 1, further comprising means for varying a focal length of a lens in the camera.

3. The camera as claimed in claim 2, wherein the first photographing mode is capable of being switched to the second photographing mode at all focal lengths.

4. The camera as claimed in claim 2, wherein the first photographing mode is capable of being switched to the second photographing mode at a focal length corresponding to a maximum angle on a wide angle side.

5. The camera as claimed in claim 1, wherein the first photographing mode is capable of being switched to the second photographing mode for every frame of a film.

6. The camera as claimed in claim 1, wherein in the first photographing mode, the visual frame display means displays the second photographing mode by restricting a vertical direction of a visual field in the visual frame; and the magnification varying means is so arranged that a distance between a photographer's pupil and the magnification varying means is shorter than a distance between the photographer's pupil and the visual frame display means.

7. The camera as claimed in claim 6, wherein a vertical region of the visual field of the visual frame for the second photographing mode is defined in a visual field of the visual frame of the first photographing mode by upper and lower lines.

8. The camera as claimed in claim 6, wherein a vertical region of the visual field of the visual frame for the second photographing mode is defined in a visual field of the visual frame of the first photographing mode by providing a mask on each of upper and lower portions thereof.

9. The camera as claimed in claim 7, wherein the line is formed with an electro-optic element for displaying the line.

10. The camera as claimed in claim 8, wherein the mask is formed with an electro-optic element for displaying the mask.

11. The camera as claimed in claim 8, wherein the mask is formed with a member for covering the visual field.

12. The camera as claimed in claim 6, further comprising a first indicating member for indicating photographing information outside the visual frame for the first photographing mode in only the first photographing mode; and a second indicating member for indicating photographing information outside the visual frame for the second photographing mode in only the second photographing mode.

13. The camera as claimed in claim 12, wherein the second indicating member is smaller than the first indicating member.

14. The camera as claimed in claim 1, wherein the visual frame display means displays the second photographing mode by increasing the visual field of the visual frame horizontally in the second photographing mode; and the magnification varying means is so arranged that a distance between the photographer's pupil and the magnification varying means is longer than a distance between the photographer's pupil and the visual frame display means.

15. The camera as claimed in claim 14, wherein the visual field is increased horizontally by moving a member composing horizontal sides of the visual frame outward.

16. The camera as claimed in claim 14, wherein the visual field is horizontally increased by making visible a visual frame, made of an electro-optic element, comprising a second visual frame in a horizontal direction thereof and a first visual frame in a vertical direction thereof, and the element is so operated that in the first photographing mode, the visual field is horizontally covered with the second visual frame while in the second photographing mode, the visual field is not horizontally covered with the second visual frame.

17. The camera as claimed in claim 14, wherein the visual frame display means restricts the visual field of the visual frame vertically in the second photographing mode.

18. The camera as claimed in claim 15, wherein the visual field is increased horizontally by moving the member composing the horizontal sides of the visual frame outward and vertically by moving a member composing vertical sides of the visual frame inward.

19. The camera as claimed in claim 15, wherein the visual field is horizontally increased by making visible a visual frame, made of an electro-optic element, comprising a second visual frame in a horizontal direction thereof and a first visual frame in a vertical direction thereof, and the element is so operated that in the first photographing mode, the visual field is horizontally covered with the second visual frame while in the second photographing mode, the visual field is not horizontally covered with the second visual frame.

20. A camera capable of switching between a first photographing mode and a second photographing mode in which a ratio of a horizontal direction size against a vertical direction size is greater than said ratio to each other in said first photographing mode and having a view finder for checking a photographing range, the view finder comprising:
visual frame display means for switching a visual frame for displaying the first photographing mode and a visual frame for displaying the second photographing mode;
view finder magnification varying means for varying magnification of the view finder; and
control means for, in switching the first photographing mode to the second photographing mode, instructing the magnification varying means to vary the magnification of the view finder so that either an angle of view corresponding to a horizontal direction or in a vertical direction in the second photographing mode is displayed in the visual frame for displaying the first photographing mode and then, instructing the visual frame display means to switch the visual frame for displaying the first photographing mode to the visual frame for displaying the second photographing mode, and the view finder magnification varying means to vary the magnification of the view finder.

21. The camera as claimed in claim 20, wherein in switching the first photographing mode to the second photographing mode, the control means instructs the view finder magnification varying means to vary the magnification of the view finder so that the angle of view corresponding to the horizontal direction in the second photographing mode is displayed in the visual frame for displaying the first photographing mode and then, instructs the visual frame display means to switch the visual frame for displaying the first photographing mode to the visual frame for displaying the first photographing mode, and the view finder magnification varying means to increase the magnification of the view finder.

22. The camera as claimed in claim 20, wherein in switching the first photographing mode to the second photographing mode, the control means instructs the view finder magnification varying means to vary the magnification of the view finder so that the angle of view corresponding to the vertical direction in the second photographing mode is displayed in the visual frame for displaying the first photographing mode and then, instructs the visual frame display means to switch the visual frame for displaying the first photographing mode to the visual frame for displaying the second photographing mode, and the view finder magnification varying means to decrease the magnification of the view finder.

23. The camera as claimed in claim 21, wherein the first photographing mode is switched to the second photographing mode at all focal lengths after the focal length corresponding to a maximum angle on a wide angle side is set.

24. The camera as claimed in claim 22, wherein the first photographing mode is switched to the second photographing mode at all focal lengths after the focal length corresponding to a maximum angle on a wide angle side is set.

25. The camera as claimed in claim 21, further comprising means for varying a focal length of a lens in the camera, wherein the first photographing mode is switched to the second photographing mode at the focal length corresponding to the maximum angle on the wide angle side.

26. The camera as claimed in claim 22, further comprising means for varying a focal length of a lens in the camera, wherein the first photographing mode is switched to the second photographing mode at the focal length corresponding to the maximum angle on the wide angle side.

27. The camera as claimed in claim 20, further comprising means for varying a focal length of a lens in the camera, wherein the first photographing mode is capable of being switched to the second photographing mode for every frame of a film.

* * * * *

UNITED STATES PATENT AND TRADEMARK OFFICE
CERTIFICATE OF CORRECTION

PATENT NO. : 5,255,030
DATED :
INVENTOR(S) : October 19, 1993

Hiromu Mukai, et al.

It is certified that error appears in the above-indentified patent and that said Letters Patent is hereby corrected as shown below:

In col. 4, line 5, change "FIG. 7" to --FIG. 17--.

In col. 14, line 4 (claim 21, line 11), change "first" to --second--.

Signed and Sealed this

Fifth Day of April, 1994

*Attest:*

BRUCE LEHMAN

*Attesting Officer*   *Commissioner of Patents and Trademarks*